(12) United States Patent
Chassin

(10) Patent No.: US 9,991,707 B2
(45) Date of Patent: Jun. 5, 2018

(54) AGGREGATE LOAD CONTROLLERS AND ASSOCIATED METHODS

(71) Applicant: Battelle Memorial Institute, Richland, WA (US)

(72) Inventor: David P. Chassin, Pasco, WA (US)

(73) Assignee: Battelle Memorial Institute, Richland, WA (US)

( * ) Notice: Subject to any disclaimer, the term of this patent is extended or adjusted under 35 U.S.C. 154(b) by 237 days.

(21) Appl. No.: 14/809,003

(22) Filed: Jul. 24, 2015

(65) Prior Publication Data

US 2017/0025851 A1 Jan. 26, 2017

(51) Int. Cl.
*H02J 3/00* (2006.01)
*F24F 11/00* (2018.01)

(52) U.S. Cl.
CPC ............ *H02J 3/005* (2013.01); *F24F 11/006* (2013.01); *F24F 11/30* (2018.01)

(58) Field of Classification Search
CPC ............ H02J 3/005; G05B 17/02; F24F 11/30
See application file for complete search history.

(56) References Cited

U.S. PATENT DOCUMENTS

| | | | |
|---|---|---|---|
| 8,643,336 B2 * | 2/2014 | Reineccius | H02J 3/32 320/128 |
| 9,528,717 B2 * | 12/2016 | Childs | F24F 11/008 |
| 2009/0099699 A1 | 4/2009 | Steinberg et al. | |
| 2010/0217651 A1 | 8/2010 | Crabtree et al. | |
| 2010/0314942 A1 | 12/2010 | Talkin et al. | |
| 2012/0029713 A1 | 2/2012 | Spicer et al. | |
| 2012/0217803 A1 | 8/2012 | Talkin et al. | |

(Continued)

FOREIGN PATENT DOCUMENTS

| | | |
|---|---|---|
| EP | 2 416 465 | 2/2012 |
| WO | WO 2014/089463 | 6/2014 |

(Continued)

OTHER PUBLICATIONS

Nakajima Hideki et al., Demand control apparatus, electric power consumption prediction method, and program therefor, Dec. 6, 2006, 44 pages.*

(Continued)

*Primary Examiner* — Sean Shechtman
*Assistant Examiner* — Tri T Nguyen
(74) *Attorney, Agent, or Firm* — Wells St. John P.S.

(57) ABSTRACT

Aggregate load controllers and associated methods are described. According to one aspect, a method of operating an aggregate load controller includes using an aggregate load controller having an initial state, applying a stimulus to a plurality of thermostatic controllers which are configured to control a plurality of respective thermostatic loads which receive electrical energy from an electrical utility to operate in a plurality of different operational modes, accessing data regarding a response of the thermostatic loads as a result of the applied stimulus, using the data regarding the response, determining a value of at least one design parameter of the aggregate load controller, and using the determined value of the at least one design parameter, configuring the aggregate load controller to control amounts of the electrical energy which are utilized by the thermostatic loads.

11 Claims, 10 Drawing Sheets

(56) References Cited

U.S. PATENT DOCUMENTS

| | | | |
|---|---|---|---|
| 2012/0325919 | A1 | 12/2012 | Warren et al. |
| 2013/0030576 | A1 | 1/2013 | Drew et al. |
| 2013/0282181 | A1* | 10/2013 | Lu .............................. H02J 3/14 700/275 |
| 2014/0152339 | A1* | 6/2014 | Mora Sanchez ........ H02M 3/00 |
| 2014/0172503 | A1 | 6/2014 | Hammerstrom et al. |
| 2014/0277761 | A1 | 9/2014 | Matsuoka et al. |
| 2015/0295402 | A1 | 10/2015 | Black et al. |
| 2015/0346741 | A1* | 12/2015 | Murthy .................. G05B 15/02 700/276 |
| 2016/0025368 | A1 | 1/2016 | Chassin et al. |
| 2016/0169154 | A1* | 6/2016 | Rao .......................... F02C 9/16 701/100 |

FOREIGN PATENT DOCUMENTS

| | | |
|---|---|---|
| WO | WO 2015/109207 | 7/2015 |
| WO | PCT/US2015/042117 | 3/2016 |
| WO | PCT/US2015/042117 | 1/2018 |

OTHER PUBLICATIONS

WO PCT/US2015/042177 Search Rept., Mar. 22, 2018, Battelle Memorial Institute.

WO PCT/US2015/042117 Writ. Opin., Mar. 22, 2016, Battelle Memorial Institute.

WO PCT/US2015/042112 IPRP, Jan. 24, 2017, Battelle Memorial Institute.

WO PCT/US2015/042122 Search Rept., Oct. 30, 2015, Battelle Memorial Institute.

WO PCT/US2015/042112 Writ. Opin., Oct. 30, 2015, Battelle Memorial Institute.

Chassin et al., "A New Thermostat for Real-Time Price Demand Response: Cost, Comfort and Energy Impacts of Discrete-Time Control Without Deadband", The University of Victoria, May 17, 2015, Canada, 31 pages.

Chassin et al., "A New Thermostat for Real-Time Price Demand Response: Cost, Comfort and Energy Impacts of Discrete-Time Control Without Deadband", The University of Victoria, May 8, 2015, Canada, 21 pages.

Chassin et al., "Utility-Scale Control of Aggregate Demand Response Using Discrete-Time Zero-Deadband (TΔ0) Residential Thermostats", The University of Victoria, May 29, 2015, Canada, 27 pages.

Chassin, "Utility-Scale Control of Aggregate Demand Response Using Discrete-Time Zero-Deadband (TΔ0) Residential Thermostats", The University of Victoria, Apr. 13, 2015, Canada, 22 pages.

Gultromson et al., "Residential Energy Resource Models for Distribution Feeder Simulation", IEEE Power Engineering Society General Meeting Conference Proceedings, Jul. 13-17, 2003, Canada, pp. 108-113.

Wang et al., "Parameter Estimation of Internal Thermal Mass of Building Dynamic Models using Genetic Algorithm", Energy Conversion and Management vol. 47, 2006, United Kingdom, pp. 1927-1941.

Chassin, "New Residential Thermostat for Transactive Systems", A Thesis Submitted in Partial Fulfillment of the Requirements for the Degree of Master of Applied Science in the Department of Mechanical Engineering, University of Victoria, Dec. 14, 2014, Canada, 185 pages.

Alam et al., "Mitigation of Rooftop Solar PV Impacts and Evening Park Support by Managing Available Capacity of Distributed Energy Storage Systems", IEEE Transactions on Power Systems vol. 28, No. 4, Nov. 2013, United States, pp. 3874-3884. (Abstract Only).

Bashash et al., "Modeling and Control Insights into Demand-Side Energy Management Through Setpoint Control of Thermostatic Loads", American Control Conference, Jun. 2011, United States, pp. 4546-4553.

Blackburn et al., "Solar Valuation and the Modern Utility's Expansion into Distributed Genereation", The Electricity Journal vol. 27, No. 1, Jan./Feb. 2014, Netherlands, pp. 18-32.

Broeer et al., "Modeling Framework and Validation of a Smart Grid and Demand Response System for Wind Power Integration", Applied Energy vol. 113, 2014, United Kingdom, pp. 199-207.

Callaway, "Tapping the Energy Storage Potential in Electric Loads to Deliver Load Following and Regulation, with Application to Wind Energy", Energy Conversion and Management vol. 50, 2009, United Kingdom, pp. 1389-1400.

Chandel et al., "The Potential Impacts of Climate-Change Policy on Freshwater Use in Termoelectic Power Generation", Energy Policy vol. 39, Aug. 2011, United Kingdom, pp. 6234-6242.

Chassin et al., "On the Equilibrium Dynamics of Demand Response in Thermostatic Loads", IEEE Proceedings of the 44th Hawaii International Conference on System Sciences, Jan. 2011, United States, 6 pages.

Chassin, "Addendum to Thesis", University of Victoria, Jul. 6, 2015, Canada, 2 pages.

Chu et al., "Scheduling of Direct Load Control to Minimize load Reduction for a Utility Suffering from Generation Shortage", IEEE Transactions on Power Systems vol. 8, No. 4, Nov. 1993, Taiwan, pp. 1525-1530.

Dagle et al., "End-Use Load Control for Power System Dynamic Stability Enhancement", Pacific Northwest National Laboratory Technical Report PNNL-11488, Feb. 1997, United States, 57 pages.

Dobson et al., "Complex Systems Analysis of Series of Blackouts: Cascading Failure, Critical Points, and Self-Organization", Chaso: An Interdisiplinary Journal of Nonlinear Science vol. 17, 2007, United States, 13 pages.

El-Ferik et al., "Identification and Weather Sensitivity of Physically Based Model of Residential Air-Conditioners for Direct Load Control: A Case Study", Energy and Buildings vol. 38, 2006, Netherlands, pp. 997-1005.

Hammerstrom et al., Pacific Northwest GridWise Testbed Demonstration Projects: Part 1. Olympic Peninsula Project, Pacific Northwest National Laboratory Technical Report PNNL-17167, Oct. 2007, United States, 157 pages.

Huberman et al., "A Multi-Agent System for Controlling Building Enviornments", Proceedings of the First International Conference on Multiagent Systems, Jun. 1995, United States, pp. 171-176.

Koch et al., "Modeling and Control of Aggregated Heterogeneous Thermostatically Controlled Loads for Ancillary Services", 17th Power Systems Computation Conference, Aug. 2011, Sweden, 8 pages.

Lu et al., "A State-Queueing Model of Thermostatically Controlled Appliances", IEEE Transactions on Power Systems vol. 19, No. 3, Aug. 2004 pp. 1666-1673.

Makarov et al., "Operational Impacts of Wind Generation on California Power Systems", IEEE Transactions on Power Systems vol. 24, No. 2, May 2009, United States, pp. 1039-1050.

Markoff et al., "Impact of Climate Change in Pacific Northwest Hydropower", Climatic Change vol. 87, 2008, Netherlands, pp. 451-469.

Mathieu et al., "Using Residential Electric Loads for Fast Demand Response: The Potential Resource and Revenues, the Costs, and Policy Recommendations", Proceedings of the ACEEE Summer Study on Energy Efficiency in Buildings, 2012, United States, pp. 189-203.

Ortega-Vazquez et al., "Estimating the Spinning Reserve Requirements in Systems with Signigcant Wind Power Generation Penetration", IEEE Transactions on Power Systems Vol. 24. No. 1. Feb. 2009. United States, pp. 114-124.

Parkinson et al., "Comfort-Constrained Distributed Heat Pump Management", The Proceedings of International Conference on Smart Grid and Clean Energy Technolagies (ICSGCE), Energy Procedia vol. 12, Sep. 2011, pp. 849-855.

Parkinson et al., "Robust Response to Hydro-Ciimatic Change in Electricity Generation Planning", Climatic Change vol. 130, Mar. 2015, Netherlands, pp. 475-489.

(56) References Cited

OTHER PUBLICATIONS

Perfumo et al., "Lead Management: Model-Based Control of Aggregate Power for Populations of Thermostaticaliy Controlled Loads", Energy Conversion and Management vol. 55, 2012, United Kingdom, pp. 36-48.

Roozbehani et al., "On the Stability of Wholesale Electricity Markets under Real-Time Pricing", 49th IEEE Conference on Decision and Control, Dec. 2010, United States, pp. 1911-1918.

Ruiz et al., "A Direct Load Control Model for Virtual Power Plant Management", IEEE Transactions on Power Systems vol. 24. No. 2, May 2009, United States, pp. 959-966.

Schweppe et al., "Homeostatic Utility Control", IEEE Transactions on Power Apparatus and Systems vol. PAS-99, No. 3, May/Jun. 1980, United States, pp. 1151-1163.

Subbarao et al., "Transactive Control and Coordinatien of Distributed Assets for Ancillary Services", Pacific Northwest National Laboratery Technicai Report PNNL-22942, Sep. 2013, United States, 56 pages.

Wang et al., "Online Voltage Security Assessment Considering Comfort-Constrained Demand Response Control of Distributed Heat Pump Systems", Applied Energy vol. 96, 2012, United Kingdom, pp. 104-114.

Widergren et al., "AEP Ohio gridSMART Demonstration Project Real-Time Pricing Demonstration Analysis", Pacific Northwest National Laboratory Technical Report PNNL-23192, Feb. 2014, United States, 92 pages.

Zhang et al., "Aggregated Medeling and Control of Air Conditioning Loads for Demand Response", IEEE Transactions on Power Systems vol. 28, No. 4, Nov. 2013, United States, pp. 4655-4664.

\* cited by examiner

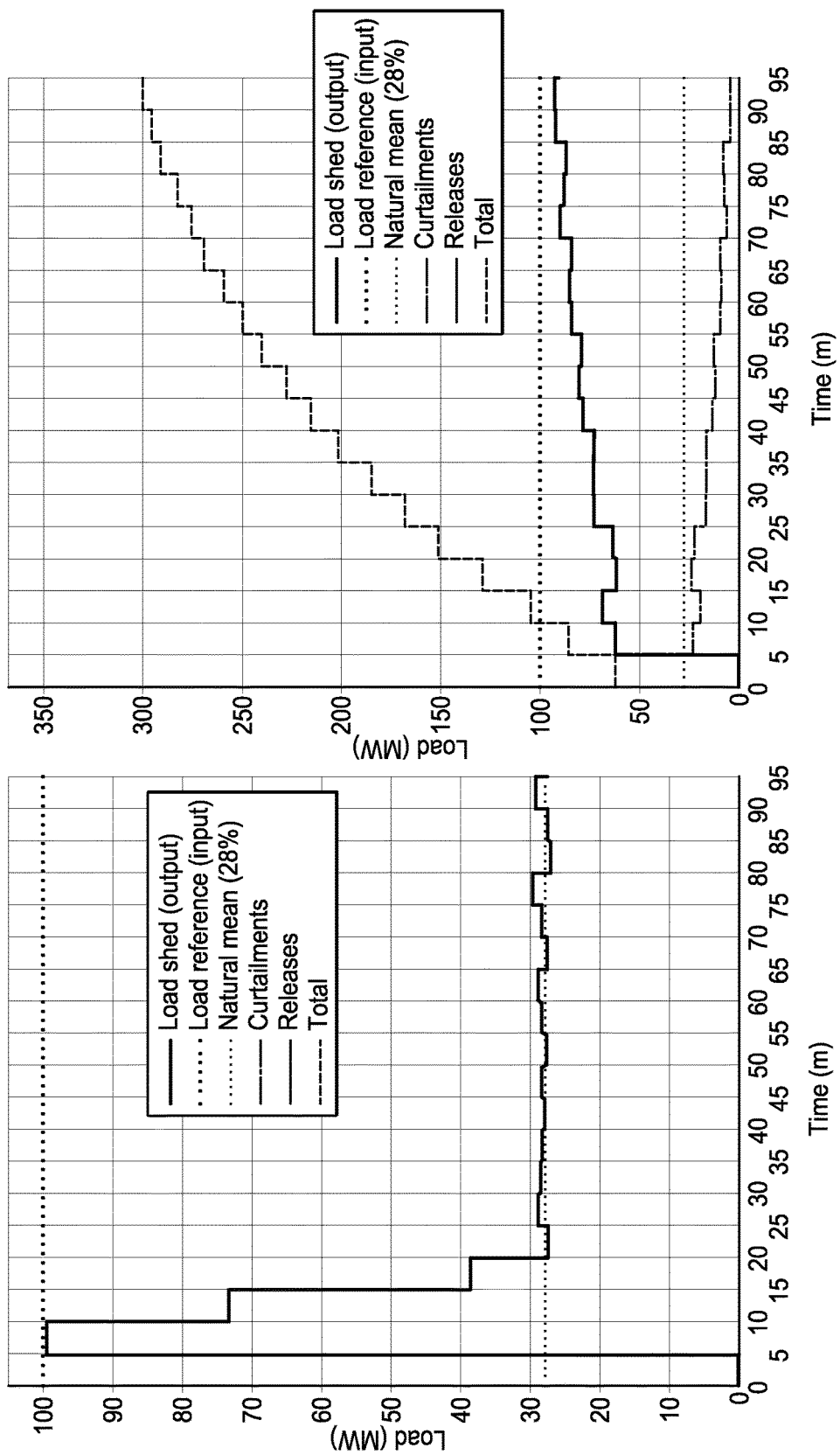

AGGREGATE LOAD CONTROLLERS AND ASSOCIATED METHODS

STATEMENT AS TO RIGHTS TO INVENTIONS MADE UNDER FEDERALLY-SPONSORED RESEARCH AND DEVELOPMENT

This invention was made with Government support under Contract DE-AC0576RLO1830 awarded by the U.S. Department of Energy. The Government has certain rights in the invention.

TECHNICAL FIELD

This disclosure relates to aggregate load controllers and associated methods.

BACKGROUND OF THE DISCLOSURE

Increasing demand for renewable electricity generation resources is driven by a desire to mitigate the climate impact of fossil-based electricity generation and satisfy ever growing electric system load. However, each class of renewable generation comes with one or more disadvantages that limit the degree to which they can be integrated in bulk system operation. Hydro-electric generation has long been employed as a significant renewable source of electricity. But, climate change may jeopardize the magnitude and certainty with which the existing asset base can meet demand, while population displacement, habitat destruction and fish stock degradation limit the growth of new assets. Shifts in both load and hydro-electric generation potential increase uncertainty in long term planning and further enhance the need for technological configurations that support operational flexibility.

Meanwhile, wind power has seen rapid growth in recent years, but the need for reliability resources limits the penetration of wind generation without additional mitigation measures such as firming resources. Solar resources are also becoming increasingly available but have intermittency challenges similar to those of wind. In addition, residential rooftop solar resources are challenging the classical utility revenue model and are known to cause voltage control issues in distribution systems. Finally, the reliable, robust control and optimal operation of an increasingly complex bulk electricity system has become a very real concern.

The traditional utility approach to renewable intermittency is to allocate additional firm reliability resources to replace all potentially non-firm renewables resources. These firm resources are generally fast-responding thermal fossil resources and where possible hydro-electrical resources as well. For new renewable resources the impact of this approach is quantified as an intermittency factor, which discounts the contribution of wind in addition to its capacity factor and limits the degree to which they can contribute to meeting peak demand. However, the intermittency factor does not account for the ramping requirements created by potentially fast-changing renewable resources. The need for fast-ramping resources discourages the dispatch of high-efficiency fossil and nuclear generation assets while promoting low-efficiency fossil and hydro where available for regulation and reserve services.

Demand response is widely regarded as a low-cost alternative to fast-response generation reserves that reduces the dispatch of inefficient generation resources. But load control strategies for demand response applications can be challenging to deploy. This is in part because the competing objectives of local and global control. It is also in part because of the complexity of the models and the simplifications required to make their analysis and design analytically tractable, numerically feasible in simulations for large-scale adequacy, and realizable in renewable integration studies.

Effective and widely used strategies for optimizing the scheduling and operation of bulk-system resources use markets to solve the cost-minimizing resource-allocation problem since they are proposed in the early 1980s. Market-based control strategies were later adapted to building control systems, generalized to feeder-scale operations, then utility-scale operations, and most recently proposed for ancillary services. Models of varying complexity have been used to study the control of aggregate loads in these cases. However, stability concerns remain when prices are used to dispatch loads and the design of general utility-based generation-following load control systems either by direct command and control or by indirect market-based control remains a largely unresolved problem.

One conventional practice for direct load control employs so-called "one-shot" load shedding strategies for emergency peak load relief only. This approach uses a controllable subset of thermostatic loads in a particular class, e.g., water heaters or air-conditioners, which are transitioned to a curtailed regime that reduces the population average power demand. After a time, these responsive load are released and return to their normal operating regimes. This strategy exhibits fluctuations in load during the initial response as well as demand recovery rebounds after the loads are released. For these reasons, "one-shot" direct load control strategies are sometimes enhanced using multiple subgroups of the responsive loads dispatched in a sequence that smooths the overall response of the load control system. However, these strategies require some knowledge of the aggregate thermal response of the buildings in which the loads are operating. In addition, these strategies are not well-suited to the more general tracking problem where load "follows" intermittent generation and have a variety of shortcomings including saturation, high sensitivity to modeling errors and noise, and stability considerations due to delays.

Aggregate building thermal load models present additional challenges when thermostatic loads are being considered. A switched-mode representation of the individual building thermal response is used to account for hysteresis of thermostats, which in turn gives rise to high-order non-linear aggregate load models. Models also include so-called "refractory states" associated with state transition delays rather than thermal parameters due to deadband of the thermostats. Tractable state space models of aggregate loads rely on model-order reduction strategies that linearize the system model and limit the number of state variables used to represent responsive loads, as illustrated in FIG. 1. These state space models represent thermostats with non-zero deadband.

At least some embodiments are directed towards apparatus, systems, and associated methods for controlling thermostatic loads which overcome shortcomings of the conventional control strategies.

BRIEF DESCRIPTION OF THE DRAWINGS

Example embodiments of the disclosure are described below with reference to the following accompanying drawings.

FIG. 10a is a graphical representation of 100 MW impulse load control at −15° C. according to one embodiment.

FIG. 10b is a graphical representation of 100 MW proportional load control at −15° C. according to one embodiment.

DETAILED DESCRIPTION OF THE DISCLOSURE

Figure 1:
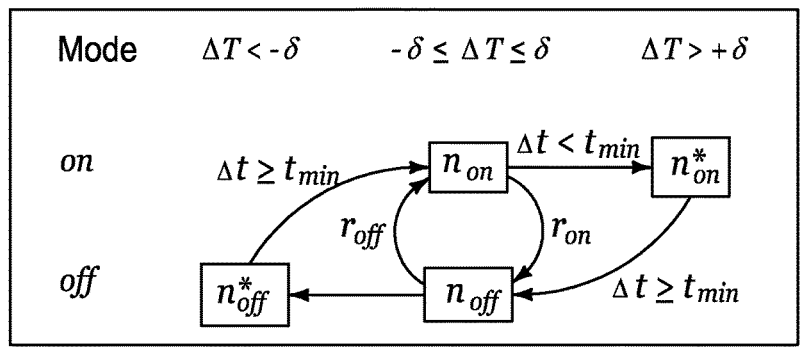
FIG. 1 is a state-space model of aggregate conventional thermostatic loads with refractory states in a heating mode.

This disclosure is submitted in furtherance of the constitutional purposes of the U.S. Patent Laws "to promote the progress of science and useful arts" (Article 1, Section 8).

At least some embodiments of the disclosure described below are directed to aggregate load controllers and associated methods. The discussion initially proceeds with respect to development of a model of aggregate load which receives electrical energy from an electrical utility. In one example, the aggregate load which is modeled, and controlled, corresponds to thermostatic loads which are coupled with a feeder of an electrical utility. In one more specific embodiment, the aggregate load controller controls thermostatic controllers (e.g., thermostats) which operate to control changes in operational modes or states of thermostatic loads being controlled (e.g., control on, off, heating and cooling modes of operation of thermostatic loads such as heat pumps, air conditioners, etc.). The aggregate load controller is configured to decrease or increase load upon the electrical utility to implement demand response control strategies in example embodiments.

The model of aggregate load is developed with respect to control of thermostatic controllers which operate with zero deadband in some embodiments and which may also be referred to as zero deadband ($T\Delta_0$) thermostatic controllers or thermostats. Additional details of zero deadband thermostatic controllers which may be controlled by the aggregate load controller are disclosed in a US Patent Application titled Thermostats and Operational Methods, filed the same day as the present application, and naming David P. Chassin, Alyona Ivanova, Emily Swan, Martin Slama, Gezachin Asmelash Gherberioragis, Abhishek Parmar, Dr. Panajotis Agathoklis, and Nedjib Djilali as inventors, and the teachings of which are incorporated herein by reference. Thereafter, the discussion provides example embodiments of aggregate load controllers which may be used to control a plurality of zero deadband thermostatic controllers in residences and businesses.

In particular, conventional thermostats including analog and digital thermostats operate with a deadband to avoid quick cycling of associated apparatus being controlled. More specifically, these thermostats control a change of state of an associated apparatus being controlled when the temperature of a conditioned area being controlled falls below or rises above a temperature setpoint, as we all as an associated deadband (e.g., 2° C.). Example embodiments of the disclosure are described below with respect to control of zero deadband thermostats when a temperature of a conditioned area being controlled falls below or rises above a desired temperature setpoint (for example, as set by an occupant of the conditioned area being controlled), and at discrete moments in time which are separated from one another by a common interval. In one embodiment, a sampling time or interval $t_s$ of the zero deadband discrete-time thermostats when changes to the operational modes or states of the apparatus being controlled may be made is set to be greater than a minimum runtime of the apparatus being controlled ($t_s > t_{min}$), also referred to as the minimum heating/cooling system refractory state time.

When the sampling time $t_s > t_{min}$, the state-space model can be simplified. In particular, in this case there is no deadband and the refractory states $n^*_{off}$ and $n^*_{on}$ shown in FIG. 1 can be ignored. The aggregate load response using a discrete-time state-transition representation for thermostatic controllers is derived according to equation 1:

$$n_{on}(k+1)=(1-\rho_{on})n_{on}(k)+\rho_{off}n_{off}(k)$$

$$n_{off}(k+1)=\rho_{on}n_{on}(k)+(1-\rho_{off})n_{off}(k) \qquad (1)$$

where k is given in units of the sampling interval $t_s$, and $\rho_{off}$ is the rate at which systems move out of the off state and $\rho_{on}$ is the rate at which they move out of the on state, which we derive from the population average properties of individual homes' thermal responses.

Figure 2:
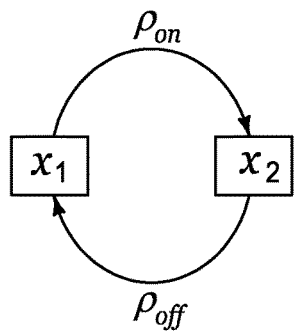
FIG. 2 is a state-space model of discrete-time zero-deadband aggregate thermostatic loads according to one embodiment.

The standard discrete-time control problem can be considered, as shown in FIG. 2, where the states $x_1$ and $x_2$ represent the number of responsive thermostatic loads in the on and off states, respectively. The time $t_{min}$ is generally regarded to be in the range of 1 to 2 minutes, so designs where $t_s < 1$ minute were not considered to avoid reintroducing the refractory states in the model. The use of zero deadband thermostatic controllers and a sampling/control interval greater than the minimum runtime in accordance with some of the described embodiments simplifies the control system and removes the refractory states providing a linear control system which may be implemented using simplified control theory.

The rate parameters $\rho_{on}$ and $\rho_{off}$ represent the fraction of those devices that cross a desired temperature setpoint $T_D$ in any given interval $t_s$ (e.g., desired temperature setpoint $T_D$ of a conditioned interior area of a residence as selected by the occupant of the house). The rate parameters of the discrete-time model are determined from how the thermostatic controller setpoint threshold $T_D$ divides the population occupying each state in one embodiment.

The demand response system state space representation is developed from Equation (1) for the net change in load $y(k)<0$ based on a load control signal $u(k)>0$ as shown in Equation (2):

$$x(k+1) = \underbrace{\begin{bmatrix} 1-\rho_{on} & \rho_{off} \\ \rho_{on} & 1-\rho_{off} \end{bmatrix}}_{G} x(k) + hu(k) \qquad (2)$$

$$y(k) = cx(k)$$

where G represents the aggregate load response, h represents the aggregate load control input matrix and c represents the aggregate load output matrix. In general the input matrix h will be determined by the utility's choice of which signal is sent to thermostatic controllers to turn the thermostatic controllers on and off. The particulars of the output matrix c are determined by the nature of the response that is of interest, e.g., total load reduced or increased, or net change in load.

In the case of residential thermostatic controllers, the rates $\rho_{off}$ and $\rho_{on}$ are computed from the population statistics of the rates $r_{on}$ and $r_{off}$ at which indoor air temperature error $\Delta T = T_A(k) - T_A(0)$ changes in a single home. The rates of change of temperature error are determined from the second-order thermal response $C_A C_M$ as set forth in Equation (3):

$$q(t) = \left(\frac{C_A C_M}{U_M}\right)\ddot{T} + \left[C_A + C_M\left(1 + \frac{U_A}{U_M}\right)\right]\dot{T} + U_A T \qquad (3)$$

where $T_D$ is the desired temperature setpoint relative to outdoor air temperature, $T_A$ is indoor air temperature relative to outdoor air temperature, $U_A$ is the thermal conductance of the indoor air to the outdoor air, $C_A$ is the heat capacity of the indoor air, $U_M$ is thermal conductance of the indoor air to the building's solid mass, and $C_M$ is the heat capacity of the building's solid mass. The heat function q(t) includes both the internal, solar and ventilation heat gains and losses $q_r(t)$, as well as the heat gain or loss $q_H(t)$ resulting from operation of the heating/cooling system. The values of the rates for an individual home may be derived according to the following:

$$r_{off}(t) = \dot{T}_{off} = -\frac{U_A}{C_A}T_A(t) - \frac{U_M}{C_A}T_M(t) + \frac{1}{C_A}q_r(t)$$

$$r_{on}(t) = \dot{T}_{on} = r_{off} + \frac{1}{C_A}q_H(t)$$

when the heating/cooling system is off and on, respectively. The heating/cooling systems are assumed to be sized appropriately so that $r_{off}(t)<0<r_{on}(t)$ when heating and $r_{on}(t)<0<r_{off}(t)$ when cooling for all t. Example embodiments are described below with respect to the heating case, although it is understood that the cooling case is similar in every respect with sign changes where appropriate.

Figure 3:
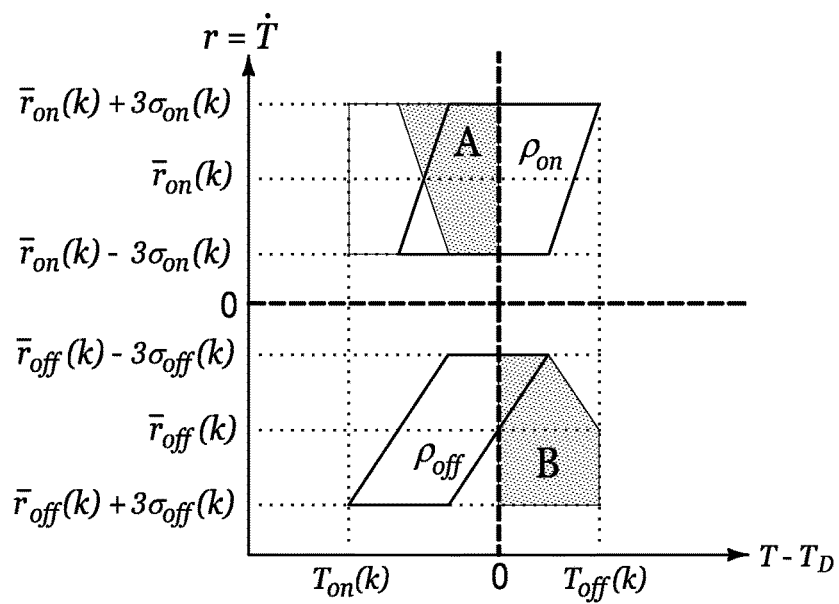
FIG. 3 is a graphical representation of discrete-time thermostat transition probabilities for on and off states according to one embodiment.

Referring to FIG. 3, all the thermostatic controllers in a particular state are assumed to be able to be inscribed by a rectangle, the horizontal dimension of which covers the range of indoor air temperatures $T_A$ and the vertical dimension of which covers the range of its derivative $r=\dot{T}$. The mean rates of devices during the interval k to k+1 is denoted $\bar{r}(k)$. A thermostatic controller operating at the lowest rate is denoted $\bar{r}(k)-3\sigma(k)$ where $\sigma(k)$ is the standard deviation of rates $r(k)$. This thermostatic controller has a lower probability of crossing the setpoint threshold TD than one with at the highest rate $\bar{r}(k)+3\sigma(k)$. The distribution of devices within the rectangle is assumed to have virtually zero skew and very nearly all of the device rates in the population are assumed to fall within the range $\bar{r}\pm 3\sigma$ for both the on and off states. In addition, $3\sigma<\bar{r}$ is assumed for both the on and off states since the thermostatic loads are assumed to be appropriately sized for their applications.

Two cases are considered depending on whether all the faster thermostatic controllers cross the $T_D$ threshold. In the first case (shown for the on state), only the thermostatic controllers in the shaded trapezoidal region A will transition to the off state. The fastest thermostatic controllers in the complementary mode will overshoot to a temperature beyond the setpoint, e.g., $T_{on}(k+1)=\bar{r}_{off}(k)+3\sigma_{off}(k)$. From this we can define the probability of a device transitioning out of the off and on states as $$\rho_{off} = \frac{\bar{r}_{off}}{\bar{r}_{on}+3\sigma_{on}} V1$$

and $$\rho_{on} = \frac{\bar{r}_{on}}{\bar{r}_{off}+3\sigma_{off}} V1$$

respectively, where V1 denotes the unity saturation limit for the fraction of thermostatic controllers that can transition from a particular state during a single time interval $t_s$.

In the second case (shown for the off state) the devices in the polygonal region B will transition to the on state. In this fast transition case we have $$\rho'_{off} = 1 - \frac{3\sigma_{off}}{4\bar{r}_{off}}$$

and $$\rho'_{on} = 1 - \frac{3\sigma_{on}}{4\bar{r}_{on}}$$

where the different forms arise from the truncation of region B as compared to region A. The choice of which value of $\rho$ to use is based on which state has the faster thermostatic controllers. When $\bar{r}_{on}>\bar{r}_{off}$, then $\rho_{on}$ and $\rho_{off}$ are used, and when $\bar{r}_{on}<\bar{r}_{off}$, then $\rho'_{off}$ and $\rho'_{on}$ are used.

The basic "one-shot" load curtailment control strategy can be described using Equation (2) with $h=[0,1]^T$ and $c=[0,1]$. Such strategies turn off $u(0)$ thermostatic loads that are on, after which we observe by how many devices the load has reduced. Given knowledge of the average kW load $\bar{q}$ per device, these quantities can be given in kW if desired. The pulse transfer function for "one-shot" load curtailment is provided in Equation (4) when discrete-time zero-deadband thermostats are employed:

$$\frac{Y(z)}{U(z)} = \frac{(z-b)}{(z-1)(z-a)} \quad (4)$$

where $a=1-\rho_{off}-\rho_{on}$ and $b=1-\rho_{on}$. The following observations may be made about this system:
1. The system is Type 1 and is therefore closed-loop proportional control not expected to exhibit any steady state error in response to a step input.
2. The system is marginally stable. The dominant non-integrating pole is stable because $0<\{\rho_{off}, \rho_{on}\}<1 \Rightarrow -1<a<1$.
3. The system has a minimum-phase because $0<\rho_{on}<1 \Rightarrow 0<b<1$.
4. The dominant pole is always to the left of the zero because $0<\{\rho_{off}, \rho_{on}\}<1 \Rightarrow a<b$.
5. The root locus is always real, with one branch between b and 1, and a second branch that extends from a to $-\infty$.

Figure 4:
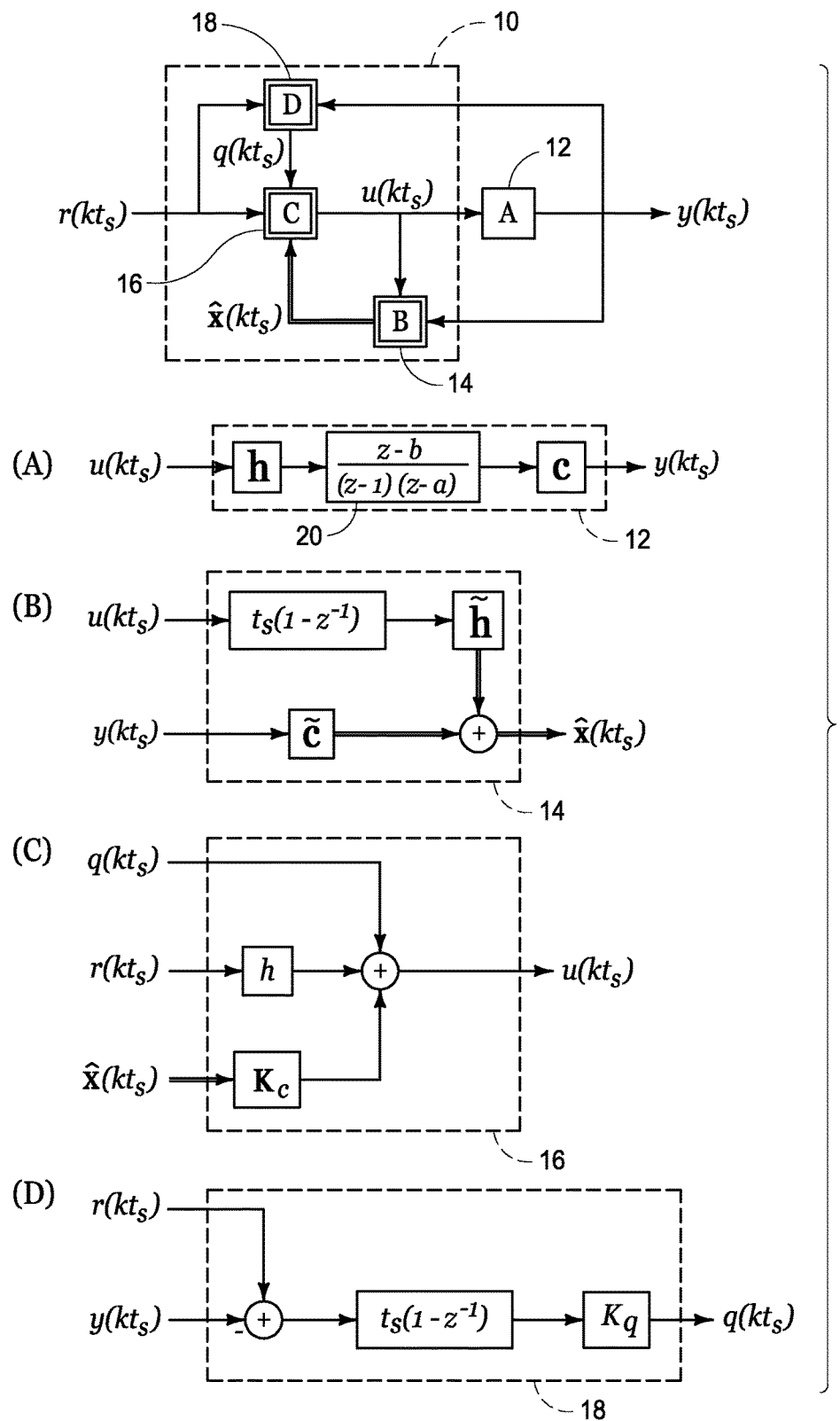
FIG. 4 is a block diagram of a direct load controller according to one embodiment.

Referring to FIG. 4, various designs of an aggregate load controller 10 which are variations implemented on the illustrated general controller design are described below according to example embodiments. The example aggregate load controller includes a plurality of subsystems including a state estimator in the form of a reduced-order observer 14, a direct load controller 16 and integral error feedback 18 in one embodiment. Other embodiments of the aggregate load controller are possible.

The aggregate load controller 10 controls increases and decreases in the consumption of electrical energy by thermostatic loads of the aggregate load 12 in one embodiment. An example embodiment of a computing device including control circuitry which may be configured to implement the illustrated controller 10 is described below with respect to FIG. 14.

The aggregate load controller 10 operates as a discrete controller which samples inputs and updates outputted control signals at discrete moments in time in the described embodiment. In one embodiment, the controller accesses an error signal, an estimation signal and an input signal discussed below at a plurality of discrete moments in time, and adjusts or updates the control signal at the discrete moments in time.

As mentioned previously, the discrete moments in time may be defined and separated by an interval which is greater than the minimum runtimes of the thermostatic loads being controlled in one embodiment. The control signals which are applied to the thermostatic controllers are a common control signal in one embodiment (e.g., all thermostatic loads coupled with the feeder receive the same control signal in one implementation).

An input or reference signal $r(kt_s)$ is provided to the controller 10 which indicates a request for an increase or decrease in consumption of electrical energy of the thermostatic loads of aggregate load 12 which receive electrical energy, for example, from a feeder of an electrical utility.

The input signal may be used in one illustrative example where electrical energy upon the feeder from wind generation decreases, and in response, the electrical utility may desire that the input signal control a decrease in electrical load upon the feeder, for example, by 100 MW to account for the decrease of electrical energy from wind generation. Operations of the aggregate load controller attempt to adjust the consumption of electrical energy utilized by the thermostatic loads in accordance with the requested amount in one embodiment.

In FIG. 4, the aggregate load 12, reduced-order observer 14, direct load controller 16 and integral error feedback 18 are represented by respective blocks A, B, C and D with additional details of example embodiments thereof provided below the depicted general controller design of FIG. 4.

The aggregate load 12 may be represented by the transfer function 20 for modelling purposes which corresponds to Equation 4 in the illustrated example. During operation, the aggregate load is the thermostatic loads which are coupled with the feeder of the utility to be controlled. The control signal $u(kt_s)$ is received by the thermostatic controllers of the aggregate load 12 which control increases or decreases in the consumption of electrical energy by the thermostatic loads coupled with the utility's feeder. The response $y(kt_s)$ of the aggregate load 12 may be determined by measuring the load upon the feeder of the electrical utility in one embodiment.

Reduced-order observer 14 receives the control signal u(kts) and response signal y(kts) and generates an estimation signal $\hat{x}((kts)$ which is indicative of the internal state of the aggregate load 12 including estimates of the operational states of a plurality of thermostatic loads which receive electrical energy from the electrical utility (e.g., the estimation signal indicating the estimate of the number of devices which are off and on as noff and non).

Direct load controller 16 receives a signal which is indicative of cumulative error $q(kt_s)$, the input or reference signal $r(kt_s)$, and the state estimation signal $x(kt_s)$ and generates the control signal $u(kt_s)$ which is applied to the aggregate load 12 to control the increase or decrease in amount of electric energy which is consumed by the thermostatic loads. The control signal may be generated based upon fluctuations in the price of electrical energy and/or rise or fall of supply or demand in illustrative examples.

The integral error feedback 18 receives the response $y(kt_s)$ of the aggregate load which is indicative of the amount of electrical energy used by the thermostatic loads, and the input or reference signal $r(kt_s)$ and generates the error signal $q(kt_s)$. In the described embodiment, the error signal is indicative of cumulative error of differences between a desired amount of electrical energy being utilized from the electrical utility and the actual amount of the electrical energy being utilized from the electrical utility during the operation of the aggregate load controller 10. The cumulative error signal $q(kt_s)$ may be used to adjust the controlling of the electrical energy consumption by direct load controller 16 in one embodiment.

Example controller design parameters for the illustrated example general aggregate load controller are as follows:
  h is the system input matrix for the response to the signal u(k). This is generally a curtailment signal and indicates how many devices are turned off.
  c is the system output matrix for the load y(k) results from the internal state x(k).
  $\bar{h}$ is the observer input matrix estimate.
  $\tilde{c}$ is the observer output matrix estimate.
  h is the reference input gain.
  $K_c$ is the observer gain matrix.
  $K_q$ is the integral error feedback gain.

The following example designs of the aggregate load controller have an objective that the controller be well suited to direct dispatch of demand response resources. Other designs of the aggregate load controller may be used in other embodiments.

The proposed aggregate load controller can be reconfigured to study the various control strategies and/or responses shown in a plurality of examples in Table 1. The flexible design of the controller allows for use of many of the basic control strategies that are typically employed for discrete-time linear time-invariant systems. This is done with the understanding that some of the parameters may change over time intervals much longer than the time horizon over which most demand response control objectives are stipulated. In particular, the state transition rates $\rho_{on}$ and $\rho_{off}$ may change as a function of outdoor air temperature, but the relationship is straightforward to obtain for the aggregate population of thermostatic loads and will be sufficiently consistent between seasons to allow simple system identification approaches to provide accurate long term model parameters. A simple method of identifying parameters of the model is discussed below based on the impulse response, which is discussed next.

The impulse response of the system is obtained in one embodiment by setting the controller design parameters $K_c=[0,0]$, $K_q=0$ and $h=1.0$. The open-loop time-domain response for an impulse $u(0)=1$ is provided by Equation (5):

$$y(k) = \frac{1-b+(a-b)a^{k-2}}{1-a} \quad (5)$$

for $$k = 1, 2, 3,$$

with $y(0)=0$, which is the response of a "one-shot" load curtailment signal when the thermostatic loads are controlled by discrete-time thermostatic controllers with no deadband.

The steady state response is:

$$y(\infty) = \frac{\rho_{on}}{\rho_{off} + \rho_{on}}$$

which observed as the population average duty cycle R and is independent of the $u(k)$ for $k>0$ provided that $\Sigma_{j=0}^{\infty} u(j) > 0$. It is also noted that any signal $u(k)>0$ adds more thermostatic loads to the controlled population while $u(k)<0$ will remove thermostatic loads from the controlled population. For any $k>0$, $u(k)=-\Sigma_{j=0}^{k-1} u(j)$ returns to the initial condition $x(0)$ and $y(\infty)=cx(0)$ when $\Sigma_{j=0}^{\infty} u(j)=0$.

Figure 5:
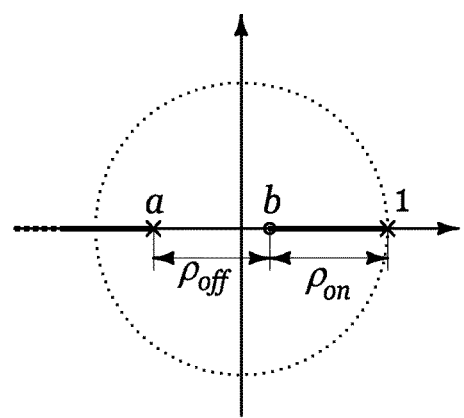
FIG. 5 is a discrete-time root-locus of aggregate zero deadband thermostatic loads according to one embodiment.

The behavior of proportional control is considered by examining the root locus of the system. With $-1<a<b<1$, the system has two real poles and a zero that is between the poles, as shown in FIG. 5.

As a Type 1 system, the steady state error for a step input is zero. Unfortunately, numerical methods do not find values of K with acceptable phase and gain margins. However, gains can be found for the fastest possible attenuation for various outdoor conditions as shown in Table 2.

TABLE 2

Maximum attenuating proportional control gains for various conditions

| Temp [° C.] | Load [% peak] | Gain K | Zero [/h] | Dominant pole [/h] | Gain margin [dB] | Phase margin [°] |
|---|---|---|---|---|---|---|
| −15 | 79 | 0.45 | 0.78 | 0.93 | 3.1 | −180 |
| −10 | 70 | 0.40 | 0.66 | 0.91 | 3.9 | −180 |
| −5 | 61 | 0.20 | 0.49 | 0.93 | 11.1 | −180 |
| 0 | 33 | 0.70 | 0.30 | 0.65 | 0.8 | −180 |
| 5 | 25 | 0.80 | 0.27 | 0.56 | 0.3 | −180 |
| 10 | 17 | 0.85 | 0.26 | 0.49 | 0.6 | −180 |
| 15 | 10 | 0.90 | 0.24 | 0.40 | 0.6 | −180 |

Figure 6:
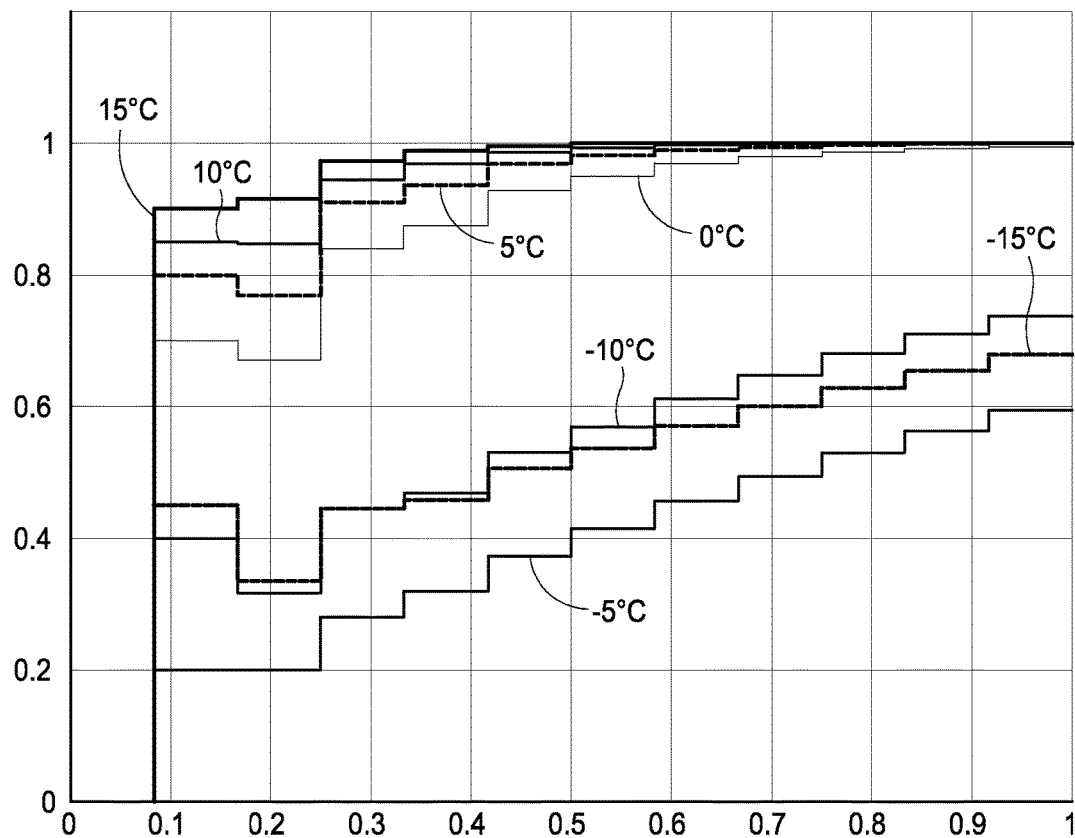
FIG. 6 is a graphical representation of 100 MW proportional load control with maximum attenuating proportional control gains according to one embodiment.

The Jury-Marden test gives us the stability constraint on the closed-loop gain:

$$\rho_{on} < K < \rho_{off} + \rho_{on}$$

which can be a very narrow range and highly dependent on accurate knowledge of the value of $\rho_{on}$, particularly when $\rho_{off}$ is small. Small values of K may lead to slow response under certain conditions. Accordingly, the use of proportional-integral-derivative (PID) control yields a stable aggregate load controller but the performance characteristics may be unsatisfactory for conditions expected to be encountered in a realistic utility operational setting. In particular, the response can be slow and oscillatory under higher load conditions when reliable aggregate load control is most needed, as shown in FIG. 6. The constraints on K limit the possibility of improving performance to such an extent that proportional control may be impractical for some direct load control applications.

Faster response than proportional control is often achieved by using a proportional derivative controller such that:

TABLE 1

Example aggregate load controller design configurations

| Configuration | Observer | | Controller | | Error feedback |
|---|---|---|---|---|---|
| | $\tilde{h}^T$ | $\tilde{c}^T$ | $K_c$ | h | $K_q$ |
| Impulse | [0, 0] | [0, 0] | [0, 0] | 1 | 0 |
| Proportional | [0, 0] | [0, 1] | $[0,\ \rho_{on} + \frac{1}{2}\rho_{off}]$ | 0 | $\rho_{on} + \frac{1}{2}\rho_{off}$ |
| Unity damping | [1, 0] | [0, 1] | $[\hat{\rho}_{on},\ 1 - \hat{\rho}_{on} - \hat{\rho}_{off}]$ | $1 - \hat{\rho}_{on} - \hat{\rho}_{off}$ | 0 |
| Deadbeat | [1, 0] | [−1, 1] | See Eq. (8) | See Eq. (9) | 0 |
| Tuned | [1, 0] | [−1, 1] | See Eq. (10) | See Eq. (11) | 0 |
| Integral error feedback | [1, 0] | [−1, 1] | See Eq. (12) | See Eq. (13) | See Eq. (12) |

$$G_{pd}(z) = \frac{(z-b)(k_1 z + k_2)}{(z-1)(z-a)}$$

Solving for the fastest possible response with zero poles provides $$K_1 = \frac{a}{b^2} - \frac{a}{b} - \frac{1}{b}$$

and $$k_2 = \frac{a}{b}$$

However, the stability margin of the system is not suitable for operation in a noisy conditions because the phase margin is always 180°.

Figure 7:
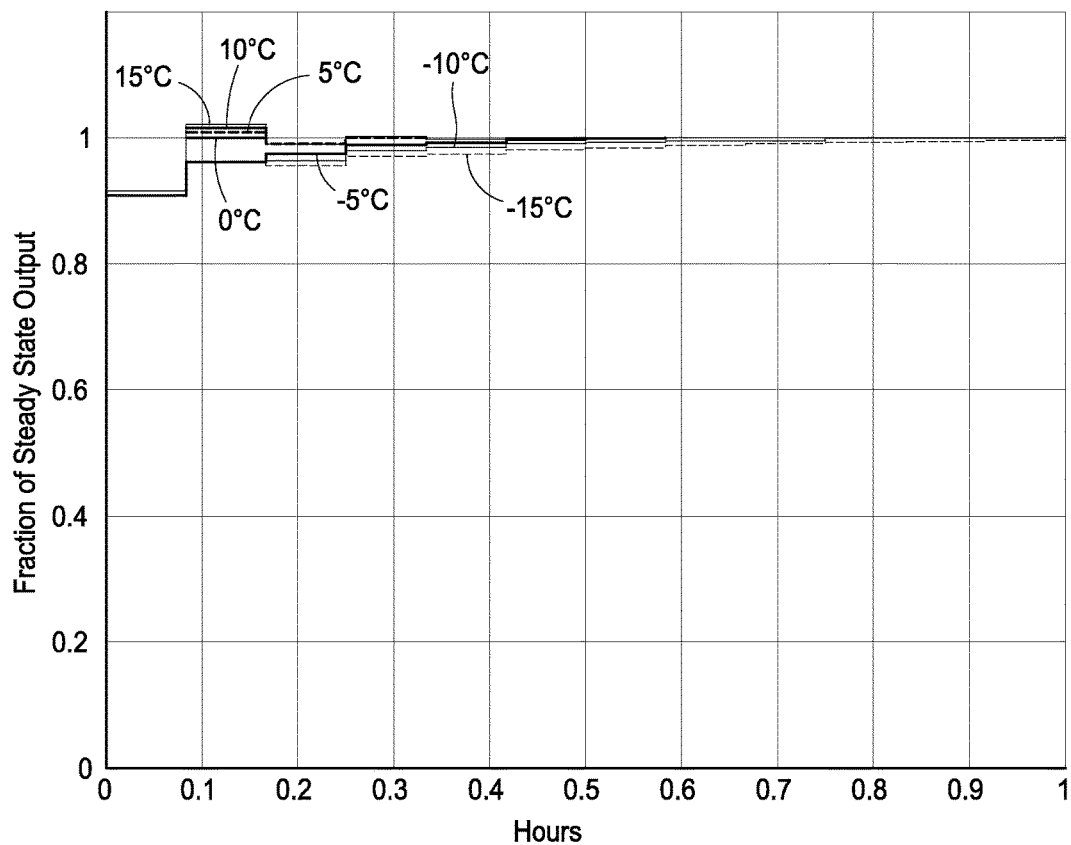
FIG. 7 is a graphical representation of a proportional/derivative controller response to step input at various conditions according to one embodiment.

Using pole placement for damping $\xi=0.8$ and settling time $t_s=1$ hour, as shown in Table 3, does not offer improvements in the systems' stability characteristics in spite of satisfactory time-domain response to step inputs, as shown in FIG. 7.

TABLE 3

Proportional-derivative controller design parameters

| $T_0$ | $K_1$ | $k_d$ | $z_1$ | $z_2$ | $p_1$ | $p_2$ |
|---|---|---|---|---|---|---|
| −15 | 9.94 | 4.38 | 0.78 | −0.44 | 0.79 | −0.40 |
| −10 | 9.94 | 4.38 | 0.66 | −0.44 | 0.68 | −0.41 |
| −5 | 9.95 | 4.38 | 0.49 | −0.44 | 0.54 | −0.42 |
| 0 | 10.52 | 4.63 | −0.44 | 0.30 | −0.38 | 0.33 |
| 5 | 10.66 | 4.69 | −0.44 | 0.27 | −0.36 | 0.30 |
| 10 | 10.77 | 4.74 | −0.44 | 0.26 | −0.35 | 0.27 |
| 15 | 10.87 | 4.79 | −0.44 | 0.24 | −0.33 | 0.25 |

A direct aggregate load control strategy is designed in one embodiment for zero deadband thermostatic controllers that maintains a constant desired load curtailment $r(k)>0$ for $k>0$, assuming that $y(0)=r(0)=0$. For this embodiment $$y(k)=r(k) \text{ for } k=1,2,3,\ldots.$$

which provides $$u(k)=(ch)^{-1}[y(k)-r(k)+c(I-G)\hat{x}(k)] \text{ for } k=1,2,3,\ldots.$$

where $\hat{x}(k)$ is an estimate of $x(k)$.

For the curtailment control system, the accumulated inputs from $u(0)$ to $u(k-1)$ represent the total number of devices N that have been curtailed up to the time k. So $\hat{x}_2(k)=y(k)$ represents the load that is still off at the time k. Therefore, $$\hat{x}_1(k) = \sum_{j=0}^{k-1} u(j) - y(k)$$

for $$k = 1, 2, 3,$$

which represents the load that has returned to the on state at the time k. This gives the estimated state $$\hat{x}(k) = \begin{bmatrix} \sum_{j=0}^{k-1} u(j) - y(k) \\ y(k) \end{bmatrix}$$

for $$k = 1, 2, 3,$$

Figure 8:
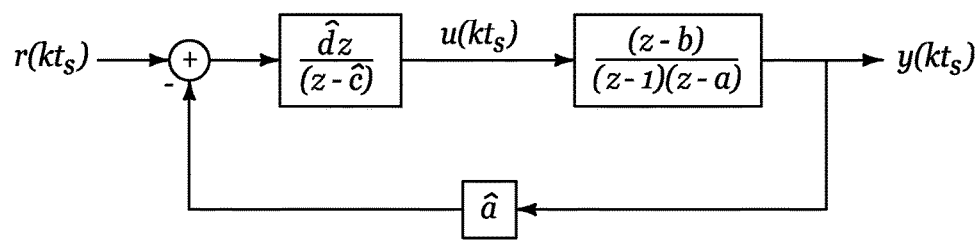
FIG. 8 is a block diagram of a unity damped system according to one embodiment.

This state can be found from the input $u(k)$ and output $y(k)$ using $$\hat{x}(k) = \tilde{h} \sum_{j=0}^{k} bu(k) + \tilde{c}y(k)$$

for $$k = 1, 2, 3,$$

where $\tilde{h}=[0,1]^T$ and $\tilde{c}=[1,-1]^T$. From this, the load control signal can be determined according to Equation (6):

$$u(k) = r(k) - \hat{a}y(k) - (1-\hat{b})\sum_{j=0}^{k-1} u(j) \quad (6)$$

for $$k = 1, 2, 3, \ldots,$$

where $\hat{a}=(1-\hat{\rho}_{off}-\hat{\rho}_{on})$ and $\hat{b}=1-\hat{\rho}_{on}$ with $\hat{\rho}_{off}$ and $\hat{\rho}_{on}$ being the estimates of the aggregate load response. This controller can be implemented in one embodiment as shown in FIG. 8 with $$\hat{c} = \frac{1}{1+\hat{\rho}on}$$

and $$\hat{d} = \frac{\hat{\rho}on}{1+\hat{\rho}on}.$$

Figure 9B:
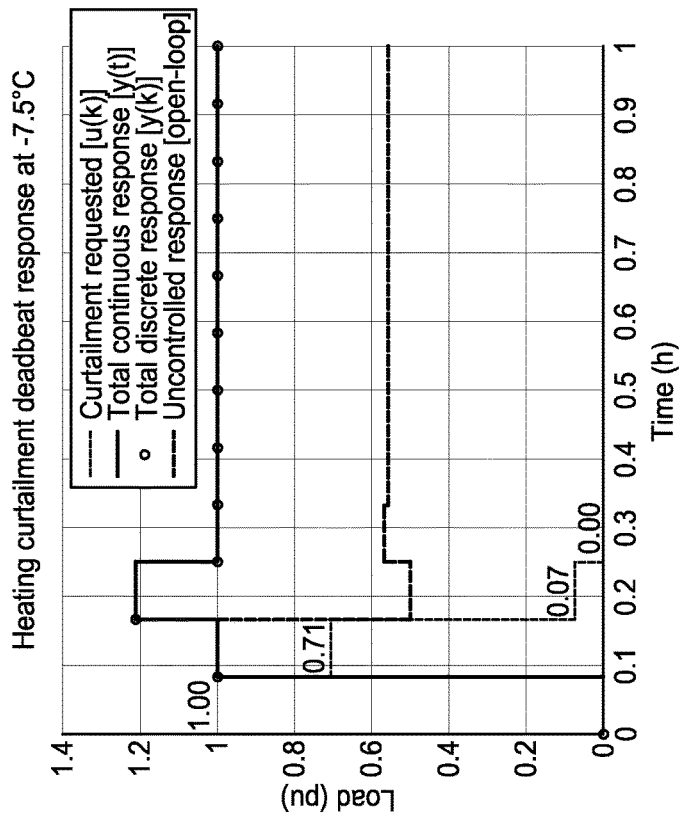
FIG. 9b is a graphical representation of a deadbeat response of aggregate load controllers according to one embodiment.
Figure 9A:
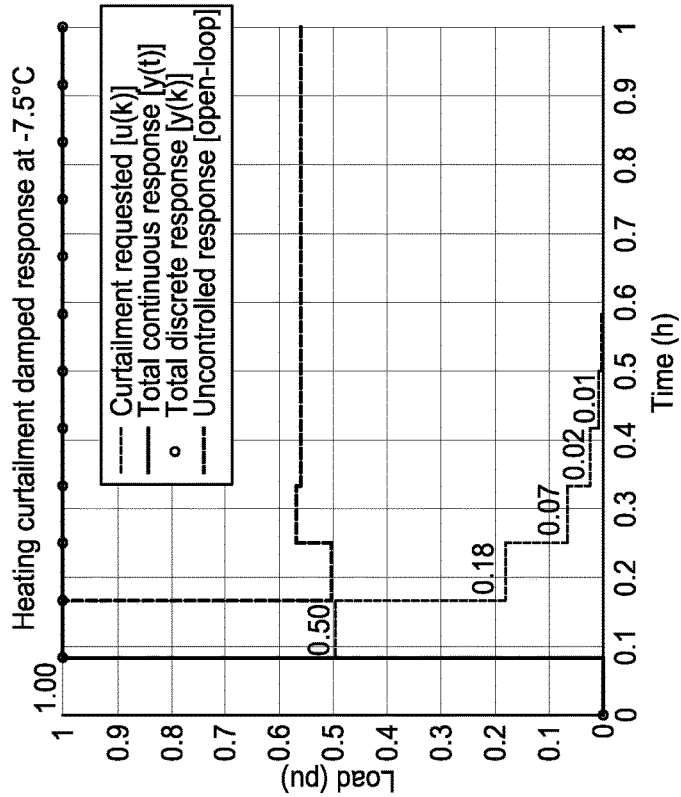
FIG. 9a is a graphical representation of a unity damped response of aggregate load controllers according to one embodiment.

It is observed that $0<\hat{d}<0.5<\hat{c}<1$. Thus, the added pole is stable and the added zero does not affect the minimum phase property of the system. This example controller should reach steady state on the first iteration and thus has a damping ratio of 100% and settling time of $t_s$, as shown in FIG. 9A.

The introduction into the system of model parameters $\hat{c}$ and $\hat{d}$ creates a source of constant disturbances in the system that can result in a steady state error. As discussed further below, integral error feedback control is used in some embodiments. An alternative approach to mitigate model error is to include information obtained directly from controllable devices. This would be the case if bidding mechanisms are used, such as when retail markets are implemented.

In one embodiment, a deadbeat controller that uses only two load control impulses to achieve steady state may be used. This example controller has the advantage that it does not continually draw on the uncontrolled population of thermostatic loads to achieve the control objective. However, it has the disadvantage that it may overshoot on the second time-step, as shown in FIG. 9B.

The state $\hat{x}(k)$ and output $y(k)$ is determined using the matrices:

$$\tilde{h} = \begin{bmatrix} \frac{(1-\hat{b})z}{z-1} \\ 0 \end{bmatrix} \text{ and } \tilde{c} = \begin{bmatrix} 0 \\ \hat{a} \end{bmatrix}$$

The feedback gain for zero poles is solved using $$K = [\hat{a} + 1 - \hat{a}]\tilde{A}^{-T}C^{-1} \text{ where } \tilde{A} = \begin{bmatrix} 1 & 0 \\ \hat{\rho}_{on} + \hat{\rho}_{off} - 2 & 1 \end{bmatrix} \quad (7)$$

is the Toeplitz matrix and $$C = \begin{bmatrix} 0 & \hat{\rho}_{off} \\ 1 & 1 - \hat{\rho}_{off} \end{bmatrix}$$

is the controllability matrix. It is determined that $$K = \begin{bmatrix} \frac{\hat{\rho}_{on}(\hat{\rho}_{off} + \hat{\rho}_{on}) - 1}{\hat{\rho}_{off}} & -\hat{\rho}_{on} - \hat{\rho}_{off} \end{bmatrix} \quad (8)$$

and the reference tracking input gain is $$h = -\frac{1}{\hat{\rho}_{on}} \quad (9)$$

As in the case of the unity damped controller, steady state error may be expected when the values of $\hat{a}$ and $\hat{b}$ are not accurately determined.

In the general case of a tuned controller, we have the same controllability matrix and Toeplitz matrix as the deadbeat controller above. Given a desired damping coefficient $\xi$ and settling time t the desired pole locations $z_1$ and $z_2$ and tuned controller gains are obtained as shown in Equations (10) and (11):

$$K_c = [\hat{\rho}_{on}[\hat{\rho}_{off} + \hat{\rho}_{on}(1 + z_1 + z_2)] + z_1z_2 - z_1 - z_2 - 1, \quad (10)$$
$$-\hat{\rho}_{off} - \hat{\rho}_{on} - z_1 - z_2]$$

and $$h = \frac{z_1 z_2 - z_1 - z_2 - 1}{\hat{\rho}_{on}} \quad (11)$$

As in the case of unity-damped and deadbeat controllers, error in $\hat{\rho}_{on}$ and $\hat{\rho}_{off}$ may result in a steady state error.

To correct for the steady state error in the tuned controller, an integral error feedback using an augmented state may be implemented $$q(k+1) = q(k) + t_s[r(k) - y(k)].$$

The integral feedback error is included in the state-space representation using the augmented controllability matrix $$C = \begin{bmatrix} 0 & \rho_{off} & 0 \\ 1 & 1 - \rho_{off} & 0 \\ 0 & -ts & 1 \end{bmatrix}$$

and that characteristic polynomial is $a(z) = (z-1)^2(z-a)$ or $$a(z) = z^3 - (2-a)z^2 + (5-2a)z - a$$

The augmented Toeplitz matrix is $$\tilde{A} = \begin{bmatrix} 1 & 0 & 0 \\ \rho_{off} + \rho_{on} - 3 & 1 & 0 \\ 2\hat{\rho}_{off} + 2\hat{\rho}_{on} - 3 & \rho_{off} + \rho_{on} - 3 & 1 \end{bmatrix}.$$

The desired characteristic polynomial is simply $\alpha(z) = (z - z_1)(z - z_2)(z - z_q)$ where $z_1$, $z_2$, and $z_q$ are the desired poles of the closed-loop system. Thus, $$\alpha(z) = z^3 - (z_1 + z_2 + z_q)z^2 + (z_1z_2 + z_1z_q + z_2z_1)z - (z_1z_2z_q)$$

from which controller gains are obtained based on the estimated model:

$$[K_C K_q] = \begin{bmatrix} \hat{\rho}_{on} + \hat{\rho}_{off} - 3 - z_1 - z_2 - z_q \\ z_1z_2 + z_1z_q + z_2z_q - 3 + 2\hat{\rho}_{on} + 2\hat{\rho}_{off} \\ 1 - \hat{\rho}_{on} - \hat{\rho}_{off} - z_1z_2z_q \end{bmatrix}^T \tilde{A}^{-T}C^{-1} \quad (12)$$

with the reference input gain $$h = \frac{1}{z_1z_2 + z_1z_q + z_2z_q + 2\hat{\rho}_{on} + 2\hat{\rho}_{off} - 3} \quad (13)$$

This control design eliminates the steady-state error induced by model errors in $\hat{\rho}_{on}$ and $\hat{\rho}_{off}$ with a settling time determined by the pole $z_q$. The utility may decide the placement of the poles $z_1$, $z_2$, and $z_q$ and which may all be at zero in one embodiment.

The controller designs were tested on an agent-based simulation of 100,000 residential thermostats using a second-order building thermal model, including internal and solar gains and ventilation losses. The second order models are linearized for the given outdoor temperature resulting in first-order models for each house such the individual homes have distinct air temperature change rates as a function of the state of the heating system. Note that the thermal model of the simulation is not the aggregate model itself, and therefore the controller is tested against a different plant model than the underlying plant model used for the controller design. The simulation models therefore include disturbances from model error and measurement noise arising from the design model order reduction itself.

To implement direct load control, thermostat setpoint changes are applied to a subset of uncontrolled homes. The magnitude of the setpoint change is generally a function of the fastest rate of change, which at peak load is approximately $r_{off}$. The magnitude of this value was chosen to ensure that the impulse response resulted in a 100% response at the first time step. The number of homes curtailed is based on the average heating system load when on such that $u(k) = 1$ is equivalent to 1 MW of load, or approximately $N_C=10^6/\overline{Q}$, where $\overline{Q}$ is the mean value of the heating system load $Q=Q_H/COP$.

When a negative value of u(k) is obtained, home are released into the uncurtailed population. The simulation first releases the homes that have been curtailed the longest, ensuring that the released population is the most diversified and exhibits the least rebound oscillation after returning to the uncurtailed population.

The controller design parameters discussed above are generated for peak load conditions using the thermal parameters shown in Table 4.

TABLE 4

House thermal parameters

| Parameter | Unit | $-3\sigma$ | Mean | $+3\sigma$ |
|---|---|---|---|---|
| $U_A$ | [BTU/° F. · h] | 200 | 500 | 800 |
| $C_A$ | [BTU/° F.] | 550 | 1000 | 1450 |
| $U_M$ | [BTU/° F. · h] | 3498 | 4999 | 6499 |
| $C_M$ | [BTU/° F.] | 7011 | 9997 | 12982 |
| $T_S$ | [° F.] | 69 | 72 | 75 |
| $Q_H$ | [BTU/h] | 464 | 15958 | 31451 |

A summary of the controller design parameters studied are shown in Table 5.

TABLE 5

Controller design parameters for peak load (−15° C.)

| | | Gains | | Errors | Max- |
|---|---|---|---|---|---|
| Control | Poles | $K_c$ | $K_q$ | h Average | imum |
| Impulse | [0] | [0.00 0.00] | 0.22 | 0.00 65% | 73% |
| Proportional | [0] | [0.00 0.62] | 0.22 | 0.62 21% | 38% |
| Damped | [0.72] | [0.22 −0.02] | 0.22 | 0.78 9% | 44% |
| Deadbeat | [0.72] | [0.98 0.98] | 0.22 | 4.57 45% | 235% |
| Tuned | [0.72] | [0.37 0.11] | 0.22 | 1.46 40% | 47% |
| Integral | [0 0.72] | [0.20 0.54] | 0.22 | 1.00 6% | 18% |

The impulse response for an outdoor temperature ($T_O$) $T_O=-15°$ C. is shown in FIG. 10A. The result illustrates the noise induced by state fluctuations in the system that are not captured by the second-order aggregate load model. The steady-state response and the settling time for the devices to reach their normal diversity is also clearly shown. The proportional control response does not have a steady state error, but this is not clearly visible because of the very slow response, as shown in FIG. 10B.

Figures 11A, 11B:
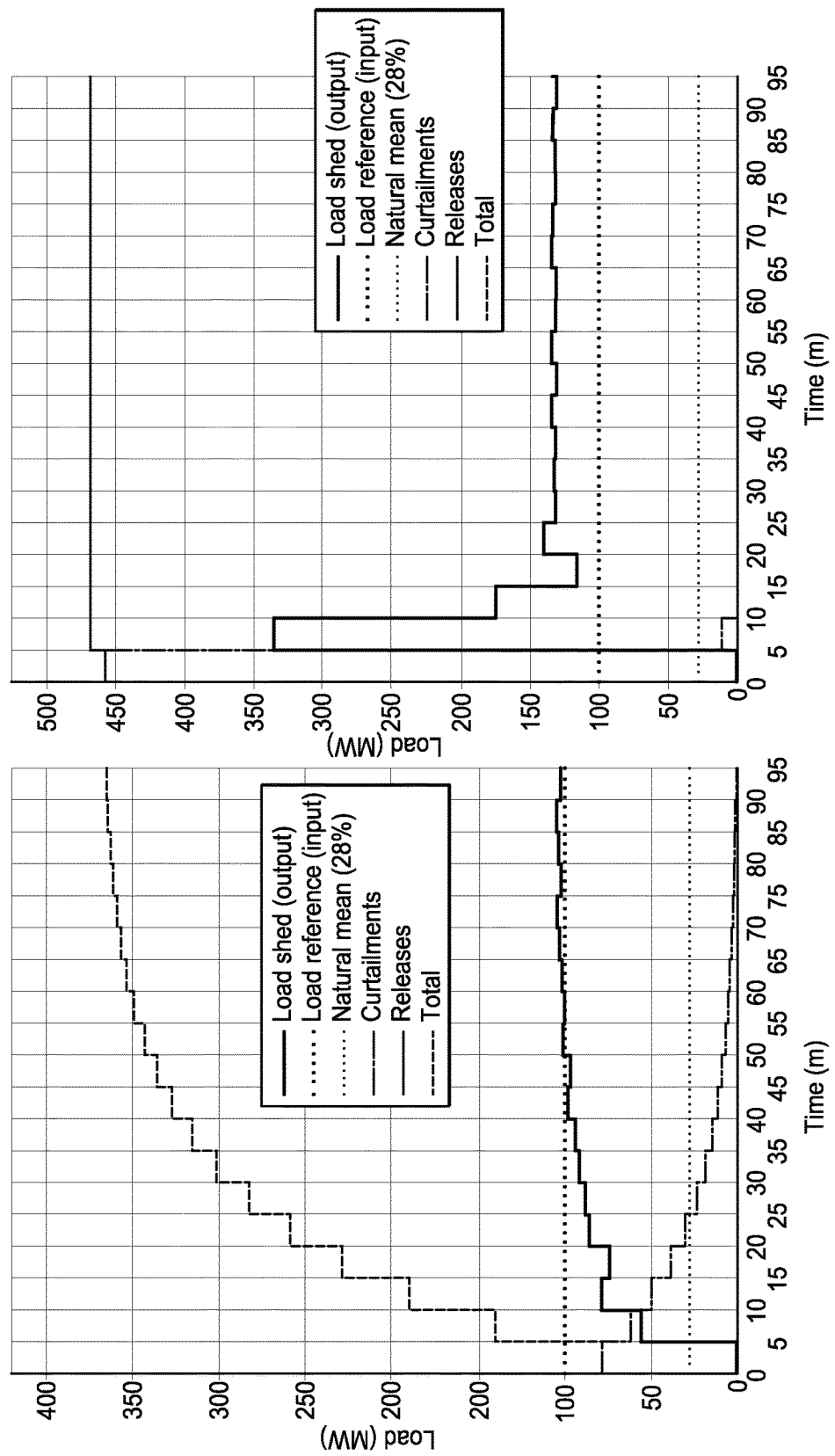
FIG. 11a is a graphical representation of 100 MW unity damping load control at −15° C. according to one embodiment.
FIG. 11b is a graphical representation of 100 MW deadbeat load control at −15° C. according to one embodiment.

The response of the unity damping controller is shown in FIG. 11A. The effect of model error can be seen in the initial response, during which it fails to achieve the desired level of curtailment. The response of deadbeat control has the expected significant overshoot, but also exhibits large steady state error, as shown in FIG. 11B.

Figures 12A, 12B:
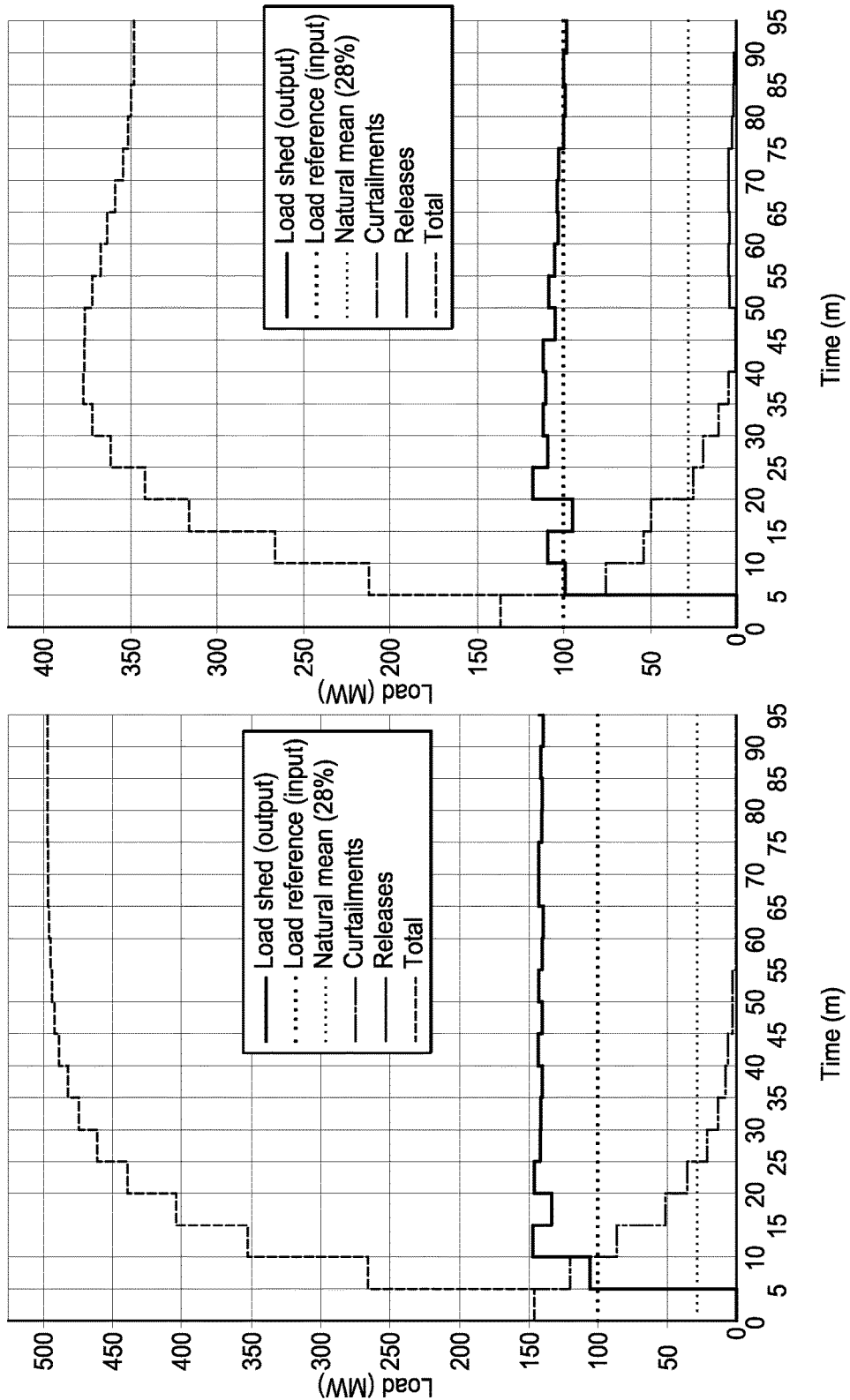
FIG. 12a is a graphical representation of 100 MW tuned load control at −15° C. according to one embodiment.
FIG. 12b is a graphical representation of 100 MW integral feedback control at −15° C. according to one embodiment.

The response of the tuned controller shows a compromise between the unity damping and deadbeat controller designs, but still exhibits a large steady state error, as shown in FIG. 12A. The integral error feedback control response shown in FIG. 12B addresses the problems identified in the previous controller designs. The aggregate load controller using integral error feedback control exhibits an acceptable level of overshoot and maintains the desired curtailment level for more than 90 minutes.

Closed loop control of zero deadband aggregate thermostatic loads may be accomplished provided a suitable control system which curtails u(k) thermostatic loads for k=0, 1, 2 . . . . Each control impulse transfers thermostatic loads between the unresponsive population and the responsive population, altering the responsive population's state x(k+1) by simply adding the new population's $x_k$(k+1) response to the input u(k). By combining load curtailment and load release impulses, the aggregate response can be shaped to track an arbitrary reference signal r(k) (which corresponds to a desired amount of a load upon a feeder of the utility, such as an adjustment to the current load), provided sufficient thermostatic loads are available in the responsive or background unresponsive population to supply the net change for each impulse u(k).

The following describes two useful extensions which may be applied to the above-described aggregate load controllers. The first is symmetric control which uses all thermostatic loads in the unresponsive population instead of only devices that are on. In some cases, this approach may be more practical for utilities to deploy, and offers the added benefit of addressing possible privacy concerns resulting from any strategy that requires the utility to know whether one particular device is actually on before choosing which thermostatic loads to signal. A second possible extension addresses model sensitivity concerns and reduces the variability in the control response by using impulse responses to calibrate the internal model used by the reduced-order observer.

In the cases where full control over the load is desired, two assumptions may be made regarding load curtailment strategies:
1. Thermostatic loads are selected regardless of their current state.
2. The load is observed based on the number of thermostatic devices that remain on rather than the number of thermostatic devices that are turned off.

The demand response strategy is then described by using $h=[\overline{R}, 1-\overline{R}]^T$ and $c=[\overline{q}, 0]$, where $$\overline{R} = \frac{\overline{r}_{off}}{\overline{r}_{on} + \overline{r}_{off}}$$

is the population average duty cycle, and $\overline{q}$ is the population average load of a single thermostatic load. The system is controllable when $$|C| = \begin{vmatrix} \overline{R} & \overline{R}(1-\rho_{on}) + (1-\overline{R})\rho_{off} \\ 1-\overline{R} & \overline{R}\rho_{on} + (1-\overline{R})(1-\rho_{off}) \end{vmatrix} = \overline{R}\rho_{on} - (1-\overline{R})\rho_{off} \neq 0$$

or when $$\overline{R} \neq \frac{\rho_{off}}{\rho_{off} + \rho_{on}}$$

a condition which is satisfied when $\sigma_{on}$, $\sigma_{off}>0$, i.e., the thermal properties of the population are diversified. The system is observable when $$|O| = \begin{vmatrix} \overline{q} & 0 \\ \overline{q}(1-\rho_{on}) & \overline{q}\rho_{off} \end{vmatrix} = \overline{q}^2 \rho_{off} \neq 0$$

which is true when a thermostatically controlled load is active.

The steady state error of the aggregate load controller depends on the observer parameters $\hat{\rho}_{off}$ and $\hat{\rho}_{on}$, particularly in the first few time steps before the integral error feedback can compensate for any accumulated output error. Model calibration can be performed be comparing the response to an impulse input with Equation (5). Responses at k=2 and 3 are sufficient to give an estimate for the observer parameters.

In one embodiment, a stimulus, such as a single impulse response, can be used to provide a relatively quick and simple method of model parameter identification using a response of the thermostatic loads as a result of the applied stimulus. The values of model parameters are obtained after a single impulse u(0) is emitted to a system with the control loops open, (e.g., the values of controller design parameters are predefined where h=1, $K_c$=0, $K_q$=0 in one example), and with initial conditions $\hat{x}(0)=[0,\ 0]^T$ corresponding to an initial state of the aggregate load controller. After one time step, the system's initial response is observed to be $\hat{x}(1)=[0, y(1)]^T$. After a second time-step, the system is observed to be in the state $\hat{x}(2)=[x_1(2), y(2)]^T$. Given Equation (1) and this response data resulting from the applied stimulus, the values of model parameters $\hat{\rho}_{on}$ and $\hat{\rho}_{off}$ corresponding to the rates of the thermostatic loads changing operational mode or state (e.g., changing between on and off) may be estimated according to the following $$\hat{\rho}_{off} = 1 - \frac{y(2)}{u(0)}$$

and similarly after a third observation y(3), the following estimation is obtained $$\hat{\rho}_{on} = \frac{y(3) - \frac{[y(2)]^2}{u(0)}}{u(0) - y(2)}.$$

This method of estimating the model parameters makes two assumptions:
1. The initial conditions are $\hat{x}(0)=0$. This condition is achieved by releasing all the thermostatic loads currently under control and waiting for the normal settling time of controlled thermostatic loads to elapse to ensure that the uncontrolled population is roughly in both state and thermal equilibrium.
2. Only a single control impulse u(0) is sent at time k=0 and then no control signals u(k) for k=1, 2, 3, . . . are sent so the impulse response can be clearly discerned in the outputs y(2) and y(3).

These conditions are relatively easy to create and the impulse u(0) applied to the thermostatic loads need not be large to obtain useful measurements, particularly if the test is repeated multiple times for each outdoor air temperature. Using this method, a database of model parameters can be obtained and used to estimate model statistics as well. Furthermore, the magnitude y(1) will give an estimate of the product hc, while observation of y(4) permits the estimation of h and c separately, if needed, in the described example.

Figure 13:
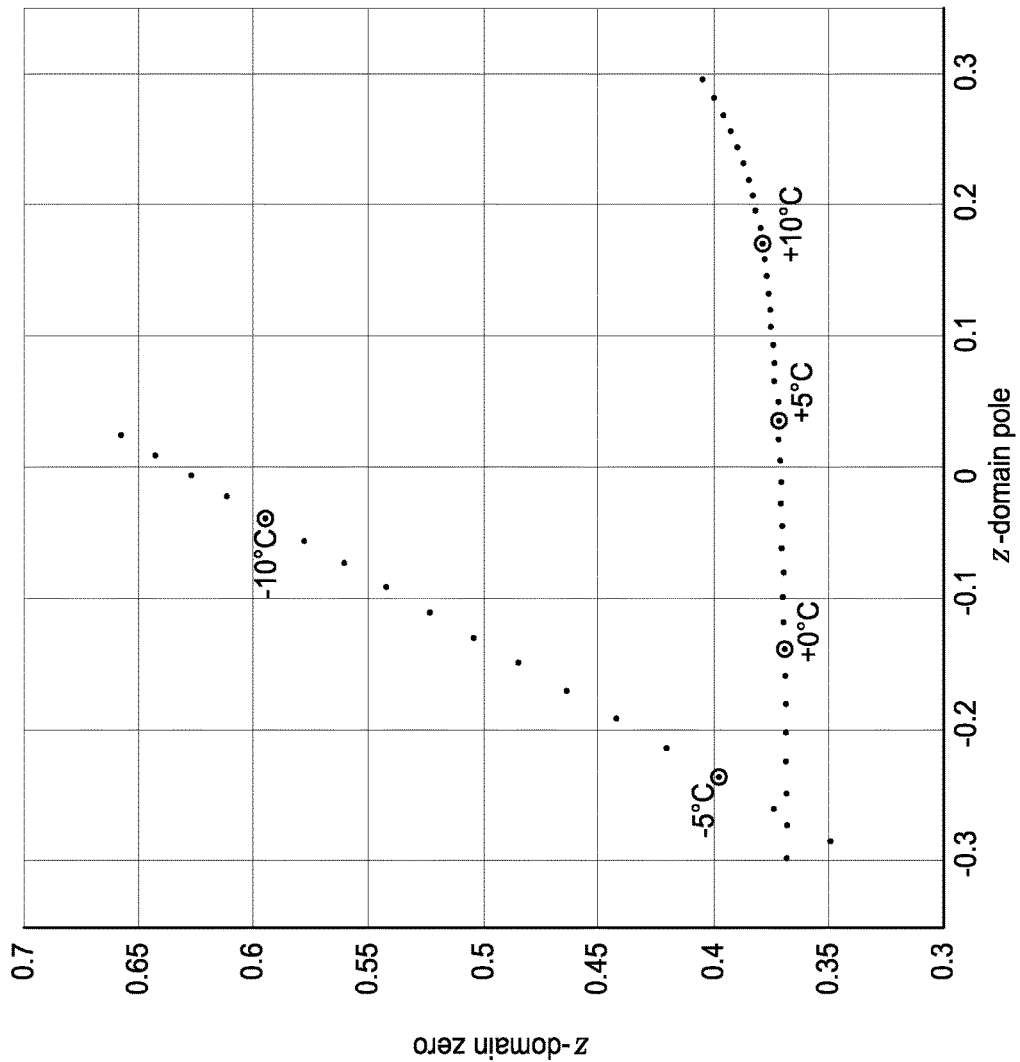
FIG. 13 is a graphical representation of zero and pole locations for a random population of 1 million homes at various outdoor air temperatures according to one embodiment.

Finally, it is not necessary to probe the system response at all outdoor conditions because the relationship of a and b is well known, particularly for infrequent peak load conditions that can be more difficult to observe. The linear relationship of a and b over the range of low outdoor air temperatures is seen in FIG. 13 and allows reliable extrapolation from more frequent conditions to more rarely observed and more critical peak load conditions.

Following determination of the values of the model parameters (e.g., estimations of $\hat{\rho}_{on}$ and $\hat{\rho}_{off}$ or a and b), the values of the model parameters are used to configure the thermostatic controller to control amounts of electrical energy which are utilized by the thermostatic loads. In one specific example, the values of the model parameters $\hat{\rho}_{on}$ and $\hat{\rho}_{off}$ are used in Equations 12 and 13 to define the controller design parameters, such as controller gains $K_c$ and $K_q$ and the reference input gain h, of the controller shown in FIG. 4.

The above example embodiments enable utility-scale direct load control when the controlled loads employ discrete-time zero deadband (TΔ0) thermostatic controllers. Dispatchers may use small adjustments to consumers' setpoints to modulate the total load with greater precision than possible using current setback control of thermostats with non-zero deadbands. A linear aggregate load model is constructed as described above in one embodiment and its fundamental characteristics are used to develop a number of alternative aggregate load control designs from first-principles according to additional example embodiments of the disclosure. As demonstrated above, the aggregate load model may be used to design a closed-loop direct load controller for a discrete-time utility-scale demand response dispatch system. As also mentioned above, the aggregate controlled load is stable, controllable and observable and has both the transient and steady-state response characteristics necessary to serve equally well for utilities that seek to control load using either direct load control or price-based indirect load control strategies in example implementations.

Figure 14:
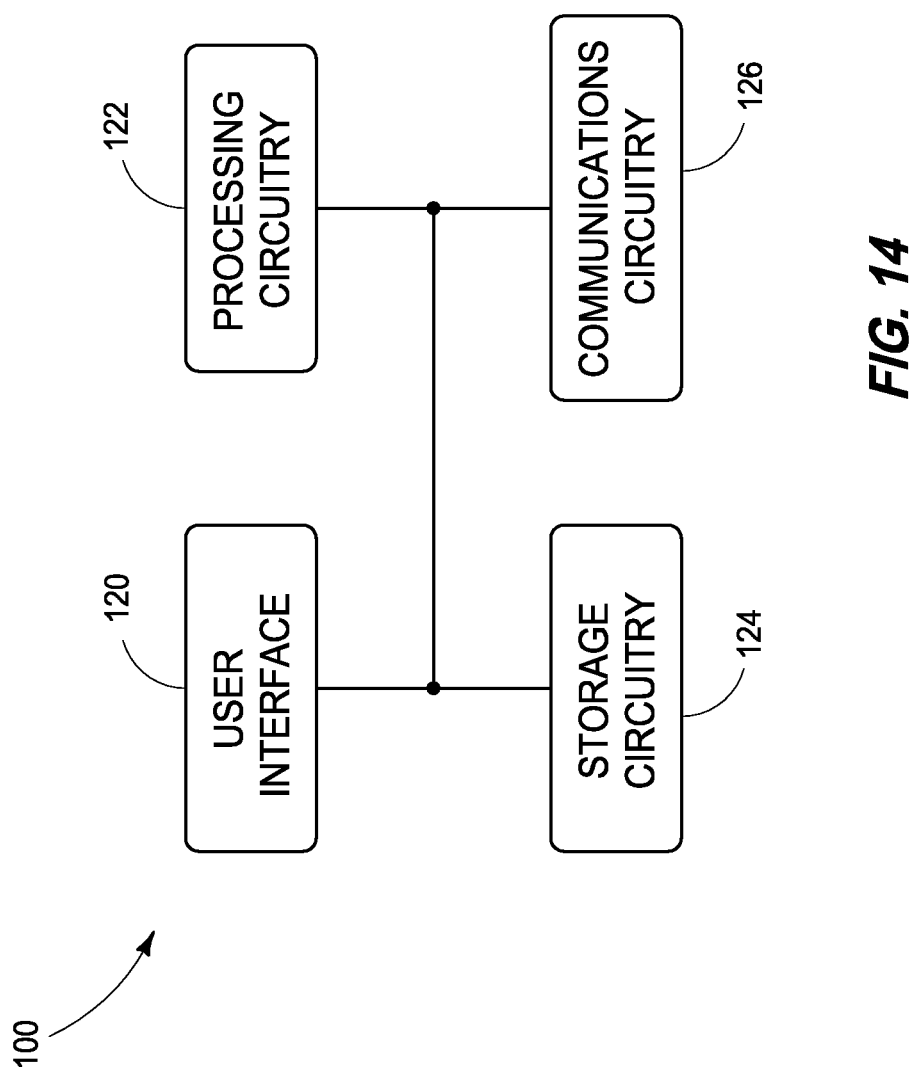
FIG. 14 is a functional block diagram of an aggregate load controller according to one embodiment.

Referring to FIG. 14, one embodiment of circuitry 100 of a computing device which is configured to implement the aggregate load controller is shown. The illustrated circuitry includes a user interface 120, processing circuitry 122, storage circuitry 124, and communications circuitry 126. Other embodiments are possible including more, less and/or alternative components.

User interface 120 is configured to interact with a user including conveying data to a user as well as receiving inputs from the user, for example, inputs indicating desired amounts of electrical energy upon a feeder of an electrical utility which is to be curtailed.

In one embodiment, processing circuitry 122 is arranged to process data, control data access and storage, issue commands, and control other desired operations. In one more specific embodiment, processing circuitry 122 may be referred to as control circuitry and configured to control the operations of the aggregate load controller illustrated in FIG. 4.

Processing circuitry 122 comprises circuitry configured to implement desired programming provided by appropriate computer-readable storage media in at least one embodiment. For example, the processing circuitry 122 may be implemented as one or more processor(s) and/or other structure configured to execute executable instructions including, for example, software and/or firmware instructions. Other example embodiments of processing circuitry 122 include hardware logic, PGA, FPGA, ASIC, state machines, and/or other structures alone or in combination with one or more processor(s). These examples of processing circuitry 122 are for illustration and other configurations are possible.

Storage circuitry 124 is configured to store programming such as executable code or instructions (e.g., software and/or firmware), electronic data, databases, image data, or other digital information and may include computer-readable storage media. At least some embodiments or aspects described herein may be implemented using programming stored within one or more computer-readable storage medium of storage circuitry 124 and configured to control appropriate processing circuitry 122.

The computer-readable storage medium may be embodied in one or more articles of manufacture which can contain, store, or maintain programming, data and/or digital information for use by or in connection with an instruction execution system including processing circuitry 122 in one embodiment. For example, computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Communications circuitry 126 is arranged to implement communications of the aggregate load controller with respect to external devices and/or networks (not shown), for example, outputting the control signal for application to the thermostatic loads being controlled. For example, communications interface 126 may be arranged to communicate information bi-directionally with respect to the aggregate load controller. Communications interface 126 may be implemented as a network interface card (NIC), serial or parallel connection, USB port, Firewire interface, Ethernet port, flash memory interface, or any other suitable arrangement for implementing communications of the controller. In one embodiment, communications circuitry 126 outputs control signals to the thermostatic controllers of the thermostatic loads.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An aggregate load controller comprising:
   control circuitry configured to:
   access an error signal which is indicative of cumulative error between a desired amount of electrical energy to be utilized from an electrical utility and an actual amount of electrical energy being utilized from the electrical utility;
   access an estimation signal which estimates the operational states of a plurality of thermostatic loads which receive electrical energy from the electrical utility;
   access an input signal which is indicative of the desired amount of electrical energy to be utilized from the electrical utility;
   use the error signal, the estimation signal, and the input signal to generate a control signal to control the operation of at least one of the thermostatic loads; and
   use the control signal to control the operation of the at least one of the thermostatic loads;
   wherein the control circuitry comprises discrete control circuitry configured to access the error signal, the estimation signal and the input signal at a plurality of discrete moments in time, and to adjust the control signal at the discrete moments in time; and
   wherein the discrete moments in time are defined by an interval, and the interval is greater than a minimum runtime of the thermostatic loads.

2. The controller of claim 1 wherein the control signal attempts to adjust the utilization of the electrical energy by the at least one of the thermostatic loads.

3. The controller of claim 1 wherein the control circuitry is configured to use integral error feedback to generate the error signal.

4. The controller of claim 1 wherein the control circuity is configured to use a state estimator to generate the estimation signal.

5. A non-transitory computer readable medium comprising programming configured to cause the control circuitry to implement the operations of claim 1.

6. An aggregate load control method comprising:
   accessing an error signal which is indicative of cumulative error between a desired amount of electrical energy to be utilized from an electrical utility and an actual amount of electrical energy being utilized from the electrical utility;
   accessing an estimation signal which estimates the operational states of a plurality of thermostatic loads which receive electrical energy from the electrical utility;
   accessing an input signal which is indicative of the desired amount of electrical energy to be utilized from the electrical utility;
   using the error signal, the estimation signal, and the input signal to generate a control signal to control the operation of at least one of the thermostatic loads;
   using the control signal to control the operation of the at least one of the thermostatic loads;
   wherein the accessings of the error signal, the estimation signal and the input signal comprise accessings at a plurality of discrete moments in time;
   adjusting the control signal at the discrete moments in time; and
   wherein the discrete moments in time are defined by an interval, and the interval is greater than a minimum runtime of the thermostatic loads.

7. The method of claim 6 wherein the control signal attempts to adjust the utilization of the electrical energy by the at least one of the thermostatic loads.

8. The method of claim 6 further comprising using integral error feedback to generate the error signal.

9. The method of claim 6 further comprising using a state estimator to generate the estimation signal.

10. A non-transitory computer readable medium comprising programming configured to cause control circuitry to implement the method of claim 6.

11. Control circuitry configured to implement the method of claim 6.

\* \* \* \* \*

UNITED STATES PATENT AND TRADEMARK OFFICE
CERTIFICATE OF CORRECTION

PATENT NO.       : 9,991,707 B2
APPLICATION NO.  : 14/809003
DATED            : June 5, 2018
INVENTOR(S)      : David P. Chassin Page 1 of 2

It is certified that error appears in the above-identified patent and that said Letters Patent is hereby corrected as shown below:

On the Title Page

(56) References Cited, page 2, 1st Column, 21st Line - Replace
"WO PCT/US2015/042177 Search Rept., Mar. 22, 2018, Battelle" with
--WO PCT/US2015/042117 Search Rept., Mar. 22, 2016, Battelle--

(56) References Cited, page 2, 1st Column, 24th Line - Replace
"WO PCT/US2015/042112 IPRP, Jan. 24, 2017, Battelle Memorial" with
--WO PCT/US042122 IPRP, Jan. 24, 2017, Battelle Memorial--

(56) References Cited, page 2, 1st Column, 26th Line - Replace
"WO PCT/US2015/042112 Writ. Opin., Oct. 30, 2015, Battelle" with
--WO PCT/US2015/042122 Writ Opin., Oct. 30, 2015, Battelle--

(56) References Cited, page 2, 1st Column, 43rd Line - Replace "Gultromson
et al., "Residential Energy Resource Models for Dis-" with
--Guttromson et al., "Residential Energy Resource Models for Dis- --

(56) References Cited, page 2, 1st Column, 57th Line - Replace
"Park Support by Managing Available Capacity of Distributed" with
--Peak Support by Managing Available Capacity of Distributed--

(56) References Cited, page 2, 2nd Column, 12th Line - Replace "Freshwater
Use in Termoelectic Power Generation", Energy Policy" with
--Freshwater Use in Thermoelectric Power Generation", Energy Policy--

(56) References Cited, page 2, 2nd Column, 28th Line - Replace "Cascading
Failure, Critical Points, and Self-Organization", Chaso:" with
--Cascading Failure, Critical Points, and Self-Organization", Chaos--

Signed and Sealed this
Sixth Day of August, 2019

Andrei Iancu
*Director of the United States Patent and Trademark Office*

(56) References Cited, page 2, 2nd Column, 61st Line - Replace "ments in Systems with Signigcant Wind Power Generation Penetra-" with --ments in Systems with Significant Wind Power Generation Penetra- --

(56) References Cited, page 2, 2nd Column, 68th Line - Replace "Parkinson et al., "Robust Response to Hydro-Ciimatic Change in" with --Parkinson et al., "Robust Response to Hydro-Climatic Change in--

(56) References Cited, page 3, 1st Column, 1st Line - Replace "Perfumo et al., "Lead Management: Model-Based Control of Aggre-" with --Perfumo et al., "Load Management Model-Based Control of Aggre- --

(56) References Cited, page 3, 1st Column, 2nd Line - Replace "gate Power for Populations of Thermostatically Controlled Loads"," with --gate Power for Populations of Thermostatically Controlled Loads",--

(56) References Cited, page 3, 1st Column, 14th Line - Replace "Subbarao et al., "Transactive Control and Coordinatien of Distrib-" with --Subbarao et al., "Transactive Control and Coordination of Distrib- --

(56) References Cited, page 3, 1st Column, 16th Line - Replace "Laboratery Technicai Report PNNL-22942, Sep. 2013, United" with --Laboratory Technical Report PNNL-22942, Sep. 2013, United--

In the Specification

Column 4, Line 27 - Replace "as we all as" with --as well as--